UNITED STATES PATENT OFFICE.

GOTTLOB WENDLER, OF MANCHESTER, ENGLAND.

MORDANT.

SPECIFICATION forming part of Letters Patent No. 609,131, dated August 16, 1898.

Application filed July 30, 1897. Serial No. 646,453. (No specimens.) Patented in England May 3, 1897, No. 10,933.

*To all whom it may concern:*

Be it known that I, GOTTLOB WENDLER, a subject of the King of Würtemberg, residing at Manchester, in the county of Lancaster, England, have invented certain new and useful Improvements in Materials or Substances for Mordanting Wool, Aerating Bread, and other Purposes, (patented in Great Britain May 3, 1897, No. 10,933,) of which the following is a specification.

This invention relates to a new or improved product which may advantageously be employed as an acid salt or as an acid-carrier in the process of mordanting woolen goods, as an element in the composition of baking-powders, gazogene powders, and the like, and generally as a substitute for cream of tartar and for tartaric acid.

The new product may be designated a boro-sulfate of sodium or of potassium or a boro-phosphate of sodium or of potassium, as the case may be. It is prepared either by acting upon the acid sulfate or upon the acid phosphate of sodium or of potassium with boracic acid under heat or by acting upon sodium or potassium borate with sulfuric or with phosphoric acid.

The new product is best prepared for commercial use in the following manner: Sixty pounds of concentrated commercial sulfuric acid having been heated to the boiling-point of the acid, there is gradually added thereto, with stirring, one hundred pounds of calcined sodium sulfate. When complete solution has been effected, there is gradually added to the mixture, with stirring, about fifteen pounds of boracic acid. The melt, having been kept heated during the whole operation, is then cooled, and the cold mass may be broken up, powdered, and packed for sale or use.

The proportion of boracic acid may vary within very wide limits, according to any special object; but for general use the proportion above mentioned may be employed.

It will be obvious that a potassium salt may be substituted for the sodium salt and that a bisulfate may be employed instead of a sulfate, in which case a correspondingly smaller quantity of sulfuric acid can be used, because of the additional acid contained in the salt; also, that if a boro-phosphate is required phosphoric acid and phosphates must be substituted for the hereinbefore-described sulfuric acid and sulfates in molecular proportions; further, that sodium borate may be employed as the source of boracic acid, in which case this salt may be substituted for the boracic acid and a correspondingly larger quantity of sulfuric acid may be employed. I prefer, however, in all cases to proceed as more particularly hereinbefore set forth.

Having now particularly described and ascertained the nature of my said invention and in what manner the same is to be performed, I declare that what I claim is—

The hereinbefore-described composition of matter adapted for use as a mordant, consisting of or containing sixty parts by weight of commercial sulfuric acid, one hundred parts of calcined alkaline sulfate such as sodium sulfate and fifteen parts of boracic acid.

In testimony that I claim the foregoing as my invention I have signed my name, in presence of two witnesses, this 16th day of July, 1897.

GOTTLOB WENDLER.

Witnesses:
GEO. HEYS,
ARTHUR MILLWARD.